United States Patent
Kusner et al.

(10) Patent No.: US 8,698,088 B2
(45) Date of Patent: Apr. 15, 2014

(54) SYSTEM AND METHOD TO DETECT TARGET RADIATION

(75) Inventors: Michael R. Kusner, Auburn Township, OH (US); Michael R. Mayhugh, Shaker Heights, OH (US)

(73) Assignee: Saint-Gobain Ceramics & Plastics, Inc., Worcester, MA (US)

( * ) Notice: Subject to any disclaimer, the term of this patent is extended or adjusted under 35 U.S.C. 154(b) by 412 days.

(21) Appl. No.: 12/899,312

(22) Filed: Oct. 6, 2010

(65) Prior Publication Data

US 2011/0079726 A1    Apr. 7, 2011

Related U.S. Application Data

(60) Provisional application No. 61/249,530, filed on Oct. 7, 2009.

(51) Int. Cl.
*G01T 1/20*    (2006.01)
*G01T 1/00*    (2006.01)

(52) U.S. Cl.
USPC ............. 250/369; 250/361 R; 250/483.1

(58) Field of Classification Search
USPC ............. 250/369, 361 R, 483.1, 370.11
See application file for complete search history.

(56) References Cited

U.S. PATENT DOCUMENTS

| | | | |
|---|---|---|---|
| 5,391,878 A * | 2/1995 | Petroff | 250/367 |
| 5,600,144 A * | 2/1997 | Worstell | 250/363.03 |
| 6,078,052 A | 6/2000 | DiFilippo | |
| 7,244,947 B2 | 7/2007 | Polichar et al. | |
| 7,335,891 B2 * | 2/2008 | Kniss et al. | 250/370.11 |
| 2003/0030003 A1 | 2/2003 | Maekawa et al. | |
| 2004/0094719 A1 | 5/2004 | Ogawa et al. | |
| 2005/0236577 A1 * | 10/2005 | Katagiri | 250/390.11 |

FOREIGN PATENT DOCUMENTS

| | | | | |
|---|---|---|---|---|
| EP | 1580576 A1 | 9/2005 | | |
| JP | 10232284 A * | 9/1998 | | G01T 1/20 |
| JP | 2004045250 A | 2/2004 | | |

OTHER PUBLICATIONS

Saint-Gobain Ceramics & Plastics, Inc., "Special Scintillators for Neutrons", 2002, 3 pgs.
M. C. Browne et al., "Prototype Neutron-Capture Counter for Fast-Coincidence Assay of Plutonium in Residues", Proc. 41st INMM Annual Meeting, Jul. 16-20, 2000. New Orleans, LA., 8 pgs.
A. P. Belian et al., "Characterizing the Detector Response and Testing the Performance of a New Well Counter for Neutron Coincidence Measurements of Plutonium in Residues", Proc 42nd INMM Annual Meeting, Jul. 15-19, 2001, Indian Wells, CA., 9 pgs.

(Continued)

*Primary Examiner* — David Porta
*Assistant Examiner* — Faye Boosalis
(74) *Attorney, Agent, or Firm* — Abel Law Group, LLP; Robert N. Young

(57) ABSTRACT

A radiation detection system can include a first material to produce a first light in response to receiving a target radiation. The radiation detection system can also include a second material to propagate a second light to a first end of the second material and to a second end of the second material, in response to receiving the first light. The radiation detection system can also include a reflector coupled to the first end of the second material. In an embodiment, the reflector can reflect the second light, so that the reflected second light can be received by a photosensor coupled to a second end of the second material.

19 Claims, 8 Drawing Sheets

(56) References Cited

OTHER PUBLICATIONS

A. P. Belian et al., "A Versatile New Sensor for Pu Assay and Independent Measurements of Neutrons and Gamma Rays", 12th Biennial RPSD Topical Meeting, Apr. 2002, Santa Fe, NM., 5 pgs.

The International Search Report and the Written Opinion for International Application No. PCT/US2010/051671 received from the International Searching Authority (ISA/KR), dated Jun. 21, 2011, 10 pages.

* cited by examiner

SYSTEM AND METHOD TO DETECT TARGET RADIATION

CROSS-REFERENCE TO RELATED APPLICATION

This application claims priority under 35 U.S.C. §119(e) to U.S. Patent Application No. 61/249,530 entitled "System and Method to Detect Target Radiation," by Kusner et al., filed Oct. 7, 2009, which is assigned to the current assignee hereof and incorporated herein by reference in its entirety.

FIELD OF THE DISCLOSURE

The present disclosure is directed to radiation detection systems and methods of making and using such systems.

BACKGROUND

Radiation detection systems are used in a variety of applications. For example, scintillators can be used for medical imaging and for well logging in the oil and gas industry. Typically, scintillators have scintillator crystals made of an activated sodium iodide or another material that is effective for detecting gamma rays or neutrons. Generally, the scintillator crystals are enclosed in casings or sleeves that include a window to permit radiation-induced scintillation light to pass out of the crystal package. The light is detected by a light-sensing device, such as a photomultiplier tube (PMT). The PMT can convert the light photons emitted from the crystal into electrical pulses. The electrical pulses are can be processed by associated electronics and may be registered as counts that are transmitted to analyzing equipment.

BRIEF DESCRIPTION OF THE DRAWINGS

The present disclosure may be better understood, and its numerous features and advantages made apparent to those skilled in the art by referencing the accompanying drawings.

The use of the same reference symbols in different drawings indicates similar or identical items.

DETAILED DESCRIPTION OF THE DRAWINGS

Numerous innovative teachings of the present disclosure will be described with particular reference to exemplary embodiments. However, it should be understood that this class of embodiments provides only a few examples of the many advantageous uses of the innovative teachings herein. In general, statements made in the present disclosure do not necessarily limit any of the various claimed articles, systems, or methods. Moreover, some statements may apply to some inventive features but not to others.

In the description below, a flow-charted technique may be described in a series of sequential actions. The sequence of the actions and the party performing the steps may be freely changed without departing from the scope of the teachings. Actions may be added, deleted, or altered in several ways. Similarly, the actions may be re-ordered or looped. Further, although processes, methods, algorithms or the like may be described in a sequential order, such processes, methods, algorithms, or any combination thereof may be operable to be performed in alternative orders. Further, some actions within a process, method, or algorithm may be performed simultaneously during at least a point in time (e.g., actions performed in parallel), can also be performed in whole, in part, or any combination thereof.

As used herein, the terms "comprises," "comprising," "includes," "including," "has," "having," or any other variation thereof, are intended to cover a non-exclusive inclusion. For example, a process, method, article, or apparatus that comprises a list of features is not necessarily limited only to those features but may include other features not expressly listed or inherent to such process, method, article, or apparatus. Further, unless expressly stated to the contrary, "or" refers to an inclusive-or and not to an exclusive-or. For example, a condition A or B is satisfied by any one of the following: A is true (or present) and B is false (or not present), A is false (or not present) and B is true (or present), and both A and B are true (or present).

The use of "a" or "an" is employed to describe elements and components described herein. This is done merely for convenience and to give a general sense of the scope of the invention. This description should be read to include one or at least one and the singular also includes the plural, or vice versa, unless it is clear that it is meant otherwise. For example, when a single device is described herein, more than one device may be used in place of a single device. Similarly, where more than one device is described herein, a single device may be substituted for that one device.

Figure 1:
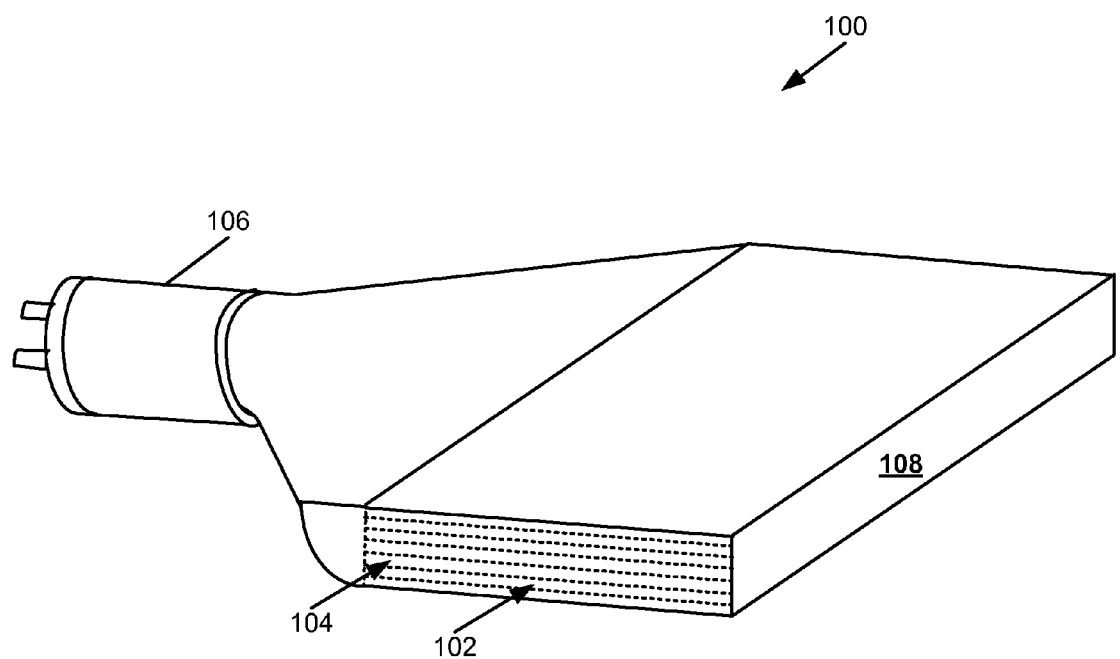
FIG. 1 is a diagram illustrating a particular embodiment of a radiation detection system.

FIG. 1 illustrates a particular embodiment of a radiation detection system 100. The system 100 can include a scintillation material 102 and a transmission material 104 adjacent to the scintillation material 102. As used herein, a transmission material can refer to a material that is configured to propagate light; however, such a material may also provide functions other than light transmission. A photosensor 106 can be coupled to an end of the transmission material 104. A reflector 108 can also abut the transmission material 104, be coupled to the transmission material 104, or a combination thereof, at another end of the transmission material 104.

The scintillation material 102 can be configured to produce a light in response to receiving a target radiation, such as a neutron, gamma radiation, other target radiation, or any combination thereof, and to produce scintillation light in response to receiving the target radiation. The light produced by the scintillation material 102 can include visible light or other radiation (such as ultraviolet radiation). In a particular embodiment, the scintillation material 102 can include a plurality of components. For example, the scintillation material 102 can include a component, such as $^6$Li or $^{10}$B (in ionized or non-ionized form), to produce a secondary particle in response to receiving a neutron. The scintillation material 102 can also include another component, such as ZnS, $CaWO_4$, $Y_2SiO_5$, ZnO, ZnCdS, or another substance to produce light in response to receiving the secondary particle. The other component can include a dopant, such as a transition metal, a rare earth metal, or another metal. For example, the other component of the scintillation material 102 can include ZnS:Ag, ZnS:Cu, $Y_2SiO_5$:Ce, ZnO:Ga, or ZnCdS:Cu.

The transmission material 104 can be configured to propagate the scintillation light to the end nearest the reflector 108 and to the end nearest the photosensor 106, in response to receiving the scintillation light from the scintillation material 102. Alternatively, the transmission material 104 can produce additional light in response to the scintillation light produced by the scintillation material 102. In an illustrative embodiment, the transmission material 104 can be configured to produce an additional light after being fluoresced by the scintillation light and to propagate the additional light to each of its ends. For example, the scintillation light can have a wavelength such that it excites a fluor material in the transmission material 104. When the fluor relaxes, it can produce additional light at a greater wavelength that is captured internally by the transmission material 104 and propagated to the ends of the transmission material 104.

A wavelength of the additional light can be different from, or the same as, a wavelength of the light produced by the scintillation material 102. In a particular embodiment, the wavelength of the additional light can be greater than the wavelength of the light produced by the scintillation material 102. For example, the wavelength of the additional light produced by the transmission material 104 can be from approximately 470 nm to approximately 700 nm. Thus, the transmission material 104 can be both a light propagation and wavelength shifting material. The transmission material 104 can be in the form of fibers, a sheet, a bar, a rod, or another suitable shape.

In a particular embodiment, the transmission material 104 can include a wavelength shifting fiber. The wavelength shifting fiber can have a cross-section that is substantially rectangular, substantially round or another shape. In a particular embodiment, the wavelength shifting fiber can include a plurality of materials that includes two materials having different refractive indices. For instance, a wavelength shifting fiber can include a polystyrene core clad with an acrylic material. In another particular embodiment, an additional cladding may be used, such as a fluoropolymer. In another particular embodiment, the transmission material 104 can include a cast sheet, such as a doped polymer sheet. For instance, the polymer sheet can include a doped polyvinyltoluene, a doped polystyrene, or a doped polymethylmethacrylate. In a particular embodiment, the transmission material 104 can include BCF-91A™-brand fibers available from Saint-Gobain Ceramics & Plastics, Inc. of Worcester, Mass., USA.

Figure 2:
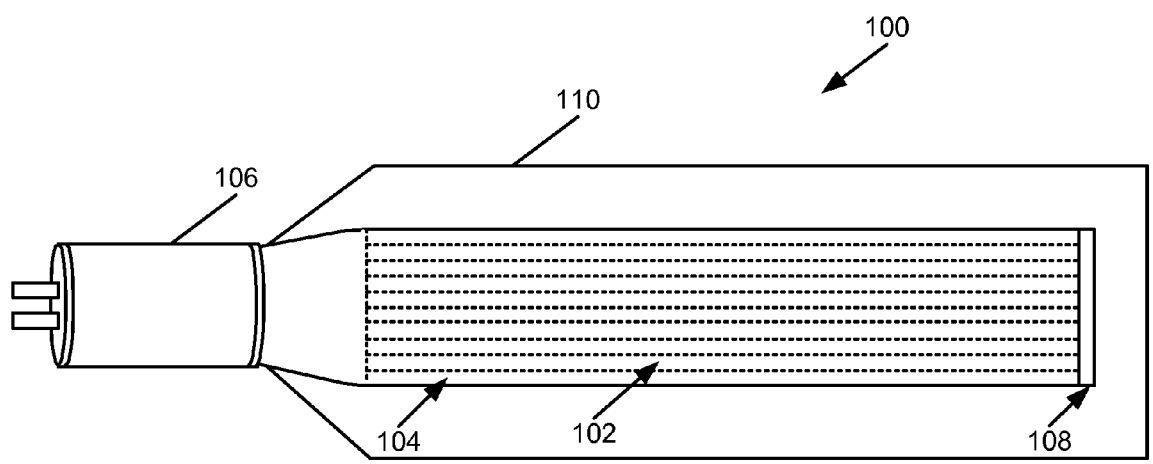
FIG. 2 is a diagram illustrating another particular embodiment of a radiation detection system.

A dopant can be included in the transmission material 104, such as a wavelength shifting fiber or doped polymer sheet, which has an absorption spectrum that substantially matches an emission spectrum of a scintillation component of the scintillation material 102. Unless otherwise noted herein, the term "rare earth" oxide generally denotes the lanthanide series elements, as well as Y and Sc. For example, each of ZnS:Ag, ZnS:Cu, Y2SiO5:Ce, and $CaWO_4$ can emit substantially blue scintillation light. The transmission material 104 can be doped such that it emits substantially green light. In another example, ZnCdS:Cu or ZnS:Cu can be used with a transmission material that emits substantially orange or red light. In a particular embodiment, the transmission material 104 can include BC-482A™-brand polymer available from Saint-Gobain Ceramics & Plastics, Inc. of Worcester, Mass., USA In an illustrative embodiment, such as the embodiment illustrated in FIG. 2, the system 100 can include a plurality of layers that includes a layer of the scintillation material 102 adjacent to a layer of the transmission material 104, and in a particular embodiment, the layers can abut each other. In an example, the plurality of layers can include alternating layers of the scintillation material 102 and layers of the transmission material 104. For example, the plurality of layers can include four layers of the scintillation material 102 alternating with five layers of the transmission material 104. The scintillation material 102 can be a powder, paste, or other form disposed in a layer adjacent to a layer of the transmission material 104. The layer of the transmission material 104 can include a layer of wavelength shifting fibers or a doped polymer sheet. In an alternative embodiment, the scintillation material 102 can be disposed in channels etched or otherwise present in or on the transmission material 104. For example, the scintillation material 102 can include a powder disposed in channels between wavelength shifting fibers in a layer of wavelength shifting fibers or in channels or pits cut into a doped polymer sheet. In another example, the scintillation material 102 can include a powder that adheres to an outer surface of the transmission material 104. In this example, the scintillation material can be applied to the transmission material 104 through spraying, adhesive, immersion of the transmission material 104 in the scintillation material 102, another process, or any combination thereof.

When the material 104 receives light from the scintillation material 102, the material 104 can propagate the light to the photosensor 106 and to the reflector 108. The reflector 108 is configured to reflect light back toward the photosensor 106 along the material 104. The reflector 108 can include a specular reflector, such as an aluminized polyester or other base material having a reflective substance disposed on a surface of the base material. Alternatively, the reflector 108 can include a diffuse or porous reflector, such as polytetrafluoroethylene (PTFE). The reflector 108 can be a substantially planar reflector, a convex reflector or a corner reflector, such as a retroreflector that reflects light back toward the light source.

In a particular embodiment, the reflector 108 can be optically coupled to the transmission material 104. For example, a specular reflector or other reflector can be coupled to the material using a silicone material, such as silicone grease, silicone glue, silicone rubber or another material having a refractive index that is closer to the refractive index of a particular component of the transmission material 104 than to the refractive index of anther component. For instance, the optical coupling material can have a refractive index that is closer to the refractive index of a polystyrene core of a wavelength shifting fiber than to an acrylic cladding of the wavelength shifting fiber In another particular embodiment, the reflector 108 may be optically coupled to the transmission material 104 without use of an optical coupling agent or material. For example, a PTFE reflector may be coupled to the transmission material 104 without the use of an optical coupling agent or material.

The photosensor 106 is coupled to an end of the transmission material 104 that can be opposite the end to which the reflector 108 is coupled. In an example, a layer of wavelength shifting fibers can be bundled together at a same end, and the photosensor 106 can be coupled to the bundled wavelength shifting fibers. The photosensor 106 can comprise a photodiode, a photomultiplier tube (PMT), a hybrid PMT that includes a photocathode and a semiconductor electron sensor, or another photosensor. The photosensor 106 is adapted to receive light propagated to the end of the material 104 to which the photosensor 106 is coupled. The photosensor 106 is also adapted to receive light reflected by the reflector 108 toward the photosensor 106.

The photosensor 106 can be configured to generate electrical pulses based on light that it receives. For example, photons can strike a photocathode of the photosensor 106 and cause the photocathode to emit electrons. Electrons emitted by the photocathode 118 can be collected at an anode of the photosensor 106, and an electrical pulse or signal can be sent to a pulse analyzer 120, pulse counter, other device, or any combination thereof. A quantity of a target radiation, such as neutrons, gamma radiation, or a combination thereof, can be determined by analyzing a shape, a rise time, a decay time, an intensity, another characteristic, or any combination thereof, of the electrical pulses generated by the photosensor 106.

In a non-limiting embodiment, the radiation detection system 100 can include a thermalyzer 110 to convert fast neutrons into thermal neutrons, for which $^6$Li and $^{10}$B have greater cross-sections. The thermalyzer 110 can include a hydrocarbon or other thermalyzing material, such as a hydrogen-rich plastic material surrounding a portion of the radiation detection system 100, a plastic compound, or other hydrocarbon compound within the transmission material 104, another thermalyzer, or any combination thereof. In another embodiment, the thermalyzer may be located at other locations, such as between the layers of scintillation material 102 and the transmission material 104 or at another suitable location between a radiation source (not illustrated, outside the radiation detection system 100) and the scintillation material 102.

Figure 3:
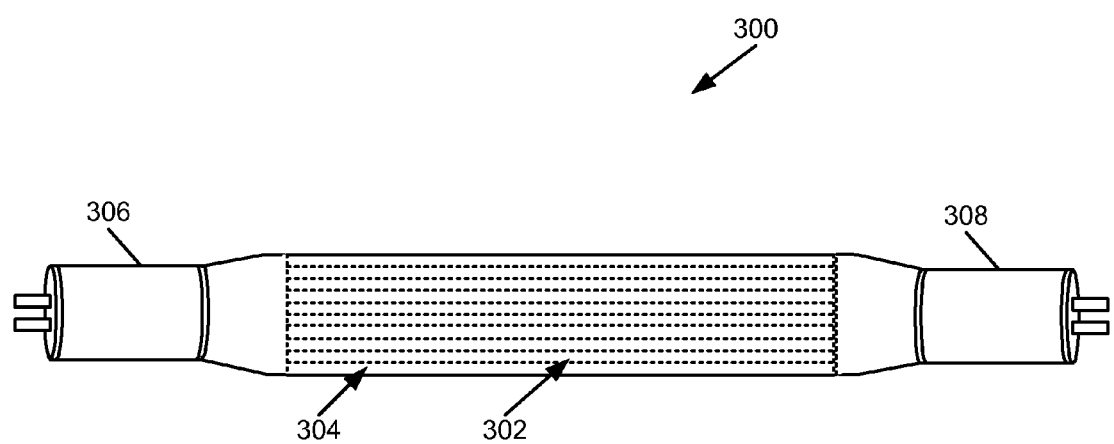
FIG. 3 is a diagram illustrating another particular embodiment of a radiation detection system.

FIG. 3 illustrates another particular embodiment of a radiation detection system 300. The system 300 can include a material 302 and another material 304 adjacent to the material 302. The material 302 can be any material described with respect to the scintillation material 102 in FIG. 1. The material 304 can be any material described with respect to the transmission material 104 in FIG. 1. A photosensor 306 can be coupled to an end of the material 304. Another photosensor 308 can be coupled to another end of the material 304. The photosensors 306 and 308 can comprise a photodiode, a PMT, a hybrid PMT, another photosensor, or any combination thereof.

Each photosensor can be adapted to receive light propagated to the end of the material 304 to which the photosensor is coupled. The photosensor 306 can be configured to generate electrical pulses based on light that it receives. The photosensor can be configured to send the electrical pulses to a pulse analyzer (not shown) that sums the outputs of the photosensors 306 and 308 before analyzing a pulse shape or otherwise identifying, analyzing or a combination thereof, a target radiation corresponding to the summed electrical pulses. In a particular embodiment, the pulse analyzer can be configured to sum electrical pulses received within at most 20 nanoseconds of each other.

Figure 4:
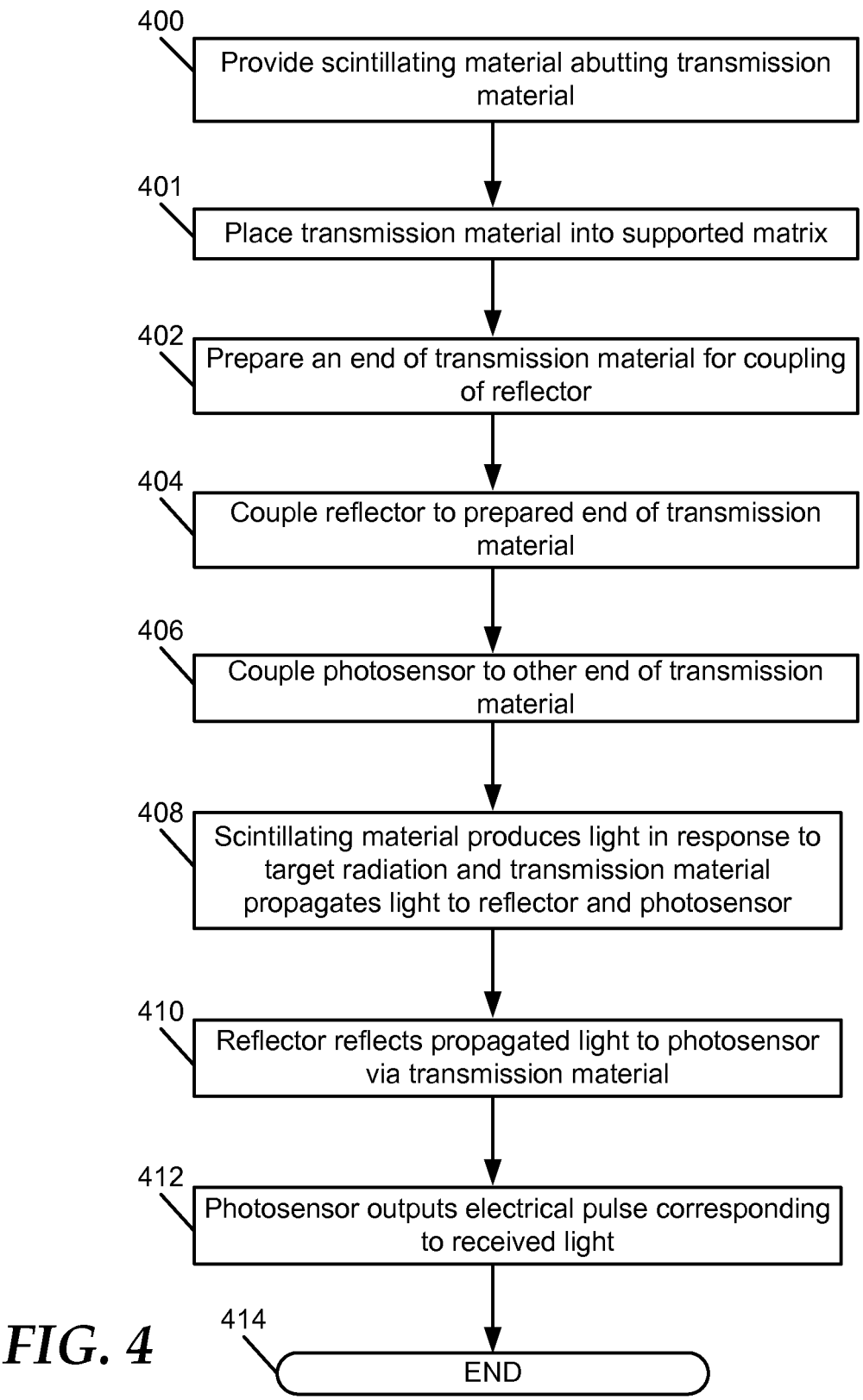
FIG. 4 is a flow diagram illustrating a particular embodiment of a method of forming a radiation detection system.

FIG. 4 illustrates a particular embodiment of a method of forming a radiation detection system. At 400, a scintillation material and a transmission material are provided abutting one another. The scintillation material and the transmission material can be disposed in adjacent layers, or the scintillation material can be disposed in channels or other voids in the transmission material. At 401, in a particular embodiment, the transmission material can be within a supported matrix. For example, wavelength shifting fibers can be bundled using a clamp or other mechanical supporting structure or can be cast together using a casting compound, such as an epoxy, a resin or another compound that can flow between the wavelength shifting fibers and subsequently be cured. Another process may be used so that the ends of the wavelength shifting fibers are within a supported matrix before prepared ends of the wavelength shifting fibers for coupling to the reflector. Moving to 402, an end of the transmission material is prepared for coupling of a reflector to that end. In an example, the transmission material can be cut. Additionally, the end can be smoothed, polished, squared, roughened, treated, etched, chemically treated, or any combination thereof.

Proceeding to 404, a reflector is coupled to the prepared end of the transmission material. In a particular embodiment, the reflector can be optically coupled to the end of the transmission material via an optical coupling material configured to substantially match a refractive index of a particular material included in the transmission material (such as polystyrene) or to otherwise increase light collection by the transmission material after reflection by the reflector. For example, silicone grease, silicone glue, silicone rubber or another optical coupling material can be used. Continuing to 406, a photosensor is coupled to another end of the transmission material.

Advancing to 408, the scintillation material can produce scintillation light in response to receiving a target radiation. The transmission material may propagate the scintillation light or other light produced by the transmission material toward the photosensor and toward the reflector. At 410, the reflector reflects the light propagated toward it back toward the photosensor. Moving to 412, the photosensor outputs an electrical pulse corresponding to light it receives directly (reaches the photosensor without needing the reflector) and from the reflector. The method can terminate at 414.

In accordance with embodiments disclosed herein, a radiation detection system is provided that can include a scintillation material to produce light in response to receiving a target radiation, such as a neutron, gamma radiation or other radiation. The radiation detection system can also include a transmission material, such as a wavelength shifting fiber or doped polymer sheet, to propagate the scintillation light or other light, in response to receiving the scintillation light. The radiation detection system can also include a reflector coupled to an end of the transmission material and a photosensor coupled to the other end of the transmission material. Use of a reflector can improve detection of target radiation by increasing the amount of light received at a photosensor, thereby improving a signal-to-noise ratio in electrical pulses output by the photosensor, where the electrical pulses correspond to light received from the other material.

Figure 5:
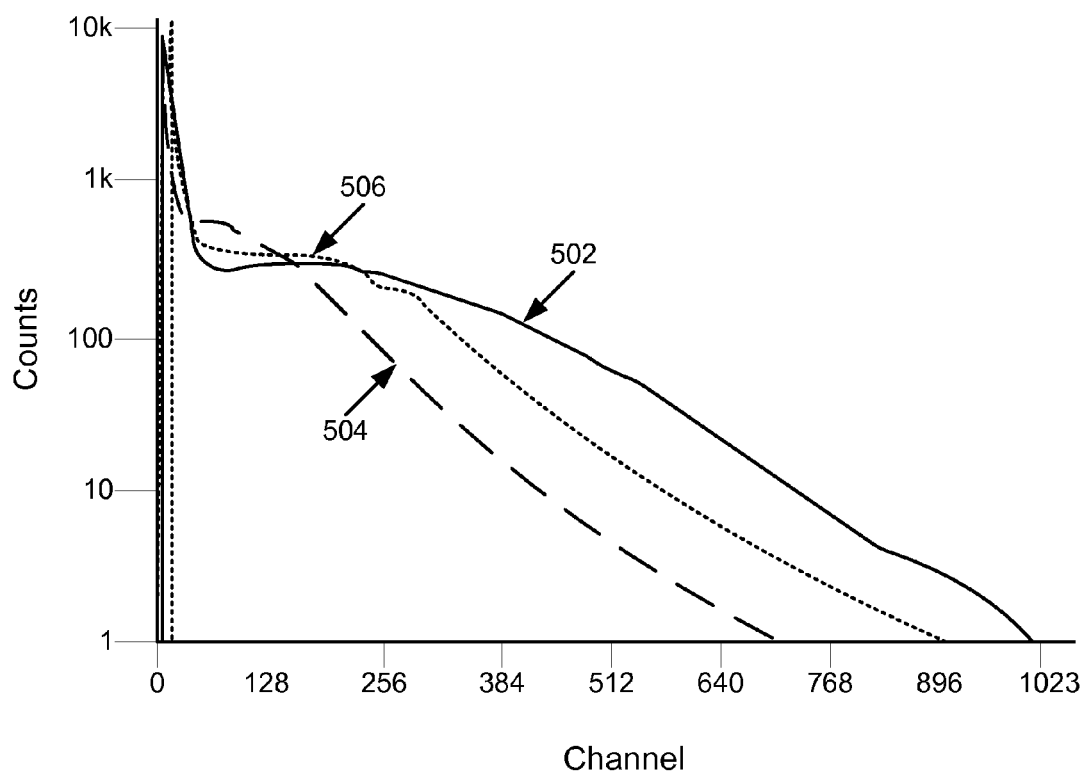
FIGS. 5-8 are plots illustrating particular embodiments of shapes of neutron-induced electrical pulses.

In an example, use of a reflector at an end of the transmission material and a photosensor at another end of the transmission material can reduce overall size of the radiation detection system compared to using two PMTs. Thus, supporting electronics that may need to be placed at a location where a second PMT would otherwise be located, thus reducing the overall size of the radiation detecting system 100. Nonetheless, in a particular embodiment, use of a reflector can cause the photosensor to receive an amount of light similar to that received by two photosensors, each coupled to opposite ends of the other material. For instance, FIG. 5 illustrates pulse height spectra corresponding to neutron detection in various radiation detection systems having one operating PMT or two operating PMTs, wherein the operating conditions of the systems are substantially the same. FIG. 5 includes a pulse height spectrum 502 corresponding to light propagated by wavelength shifting fibers in a 5 cm (2 in.) by 127 cm (50 in.) radiation detection system having a PMT operating at each end. The pulse height spectrum 502 represents a histogram of channels for a plurality of electrical pulses output by the PMTs. Channels correspond to voltage, and thus a higher channel number corresponds to a higher voltage. The x-axis intercept (count=1) represents that peak voltage that was detected.

Additionally, FIG. 5 illustrates another pulse height spectrum 504 corresponding to light propagated by wavelength shifting fibers in a 5 cm by 127 cm radiation detection system, in which a PMT is coupled to each end but only one PMT is operating. Such a configuration corresponds to a radiation detection system having one PMT coupled to one end of the wavelength shifting fibers and no reflector or PMT coupled to the other end. FIG. 5 also illustrates another pulse height spectrum 506 corresponding to light propagated by wavelength shifting fibers in a 5 cm by 127 cm radiation detection system having a PMT coupled to one end and a reflector, which includes an aluminized polyester sheet, coupled to the other end. In the embodiment as illustrated in FIG. 5, the aluminized polyester sheet includes a polyethylene terephthalate, and more particularly, MYLAR®-brand polymer. (MYLAR is a registered trademark of DuPont Teijin Films U.S. Limited Partnership; Wilmington, Del.) The highest channel in pulse height spectrum 502 is approximately channel 1000, the highest channel in pulse height spectrum 504 is approximately channel 700, and highest channel in pulse height spectrum 506 is approximately channel 900. Thus, the highest channel, and therefore, the highest peak voltage sensed, for the radiation detection system including the reflector (pulse height spectrum 506), is between the highest channels (peak voltage sensed) for the radiation detection system with two operating PMTs and the radiation detection system with two PMTs (pulse height spectrum 502) and only one PMT operating (pulse height spectrum 504). Note that the highest channel (highest peak voltage sensed) for the radiation detection system including the reflector is closer to the highest channel (peak voltage sensed) for the radiation detection system with two operating PMTs than the radiation detection system with two PMTs and only one PMT operating.

Figure 6:
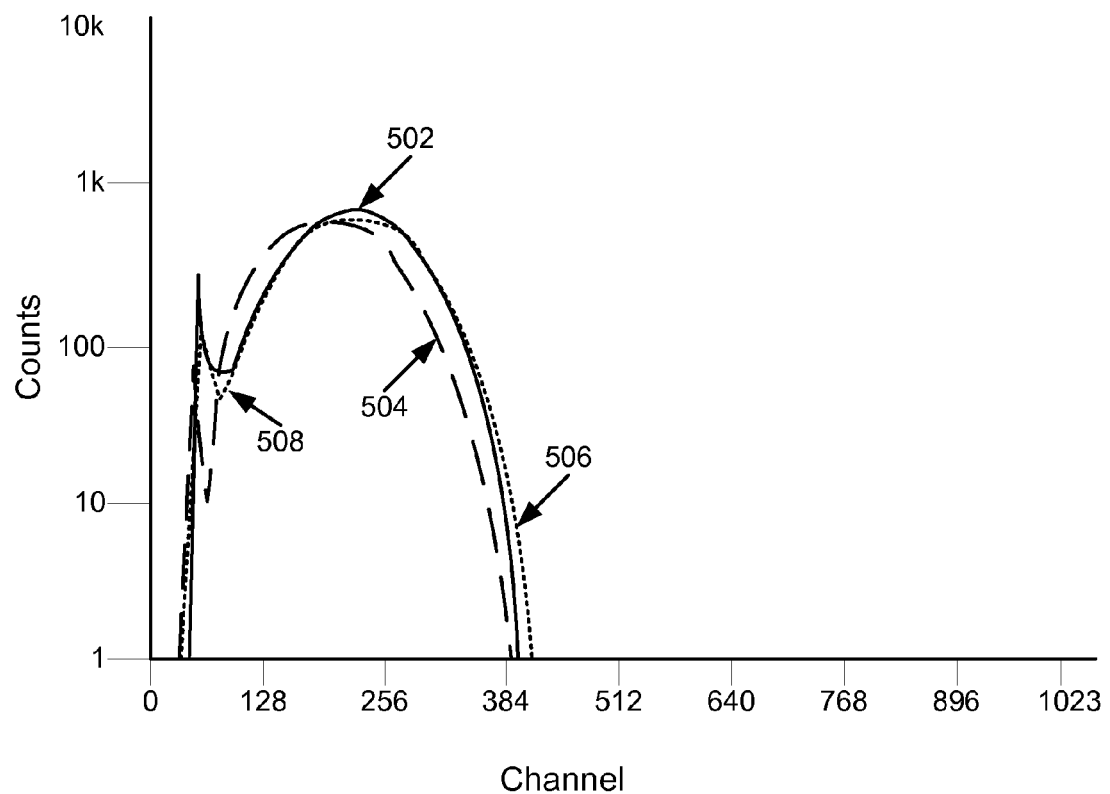

FIG. 6 illustrates the pulses height spectra 502, 504 and 506 after pulse shape analysis. As illustrated, the pulse height spectrum 506 corresponding to use of a reflector including an aluminized MYLAR®-brand polymer, and an operating PMT, more closely resembles the pulse height spectrum 502 corresponding to two operating PMTs, than the pulse height spectrum 504 in which only one PMT is operating and no reflector is used. Within the pulse height spectra illustrated in FIG. 6, a better signal-to-noise (S/N) ratio occurs with a deeper valley between the initial relatively sharp peak and the second relatively rounded peak. Use of the aluminized reflector provides a better S/N ratio than using two operating PMTs, as illustrated by the valley 508. As used herein, a better S/N ratio can correspond to a higher value when the S/N ratio is quantified.

Figure 7:
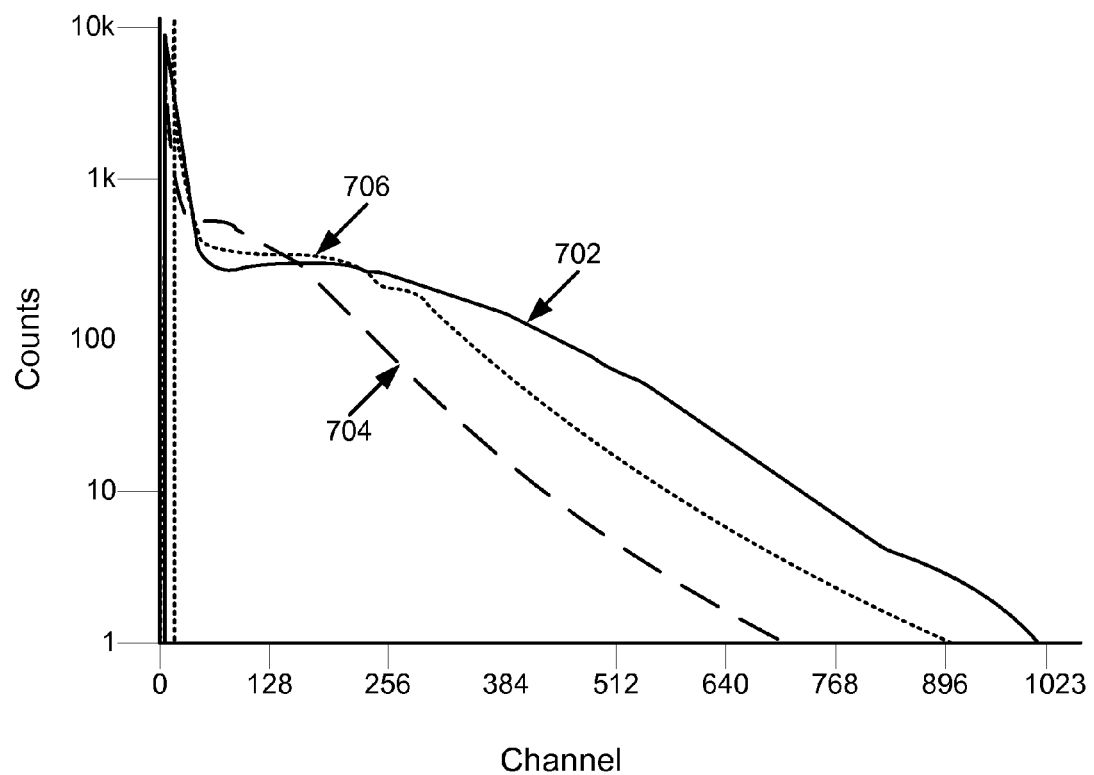
Figure 8:
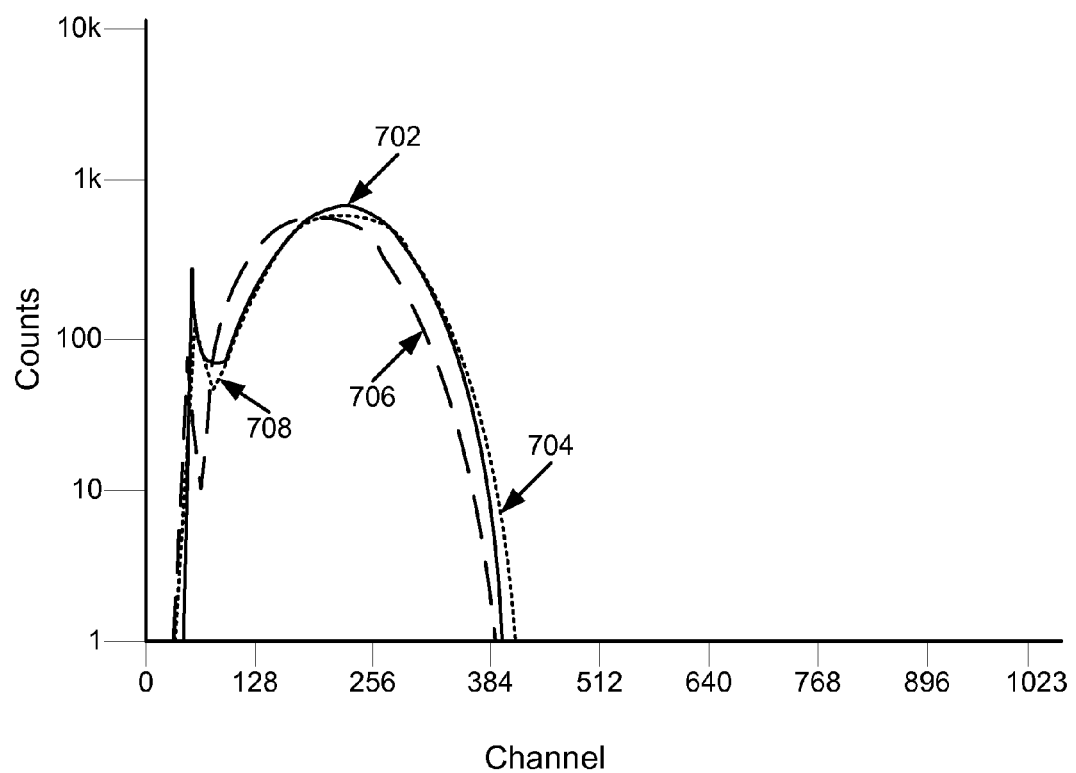

FIGS. 7 and 8 include pulse height spectra for radiation detector systems operating as described with respect to the radiation detector systems used to generate data in FIGS. 5 and 6, except that a specular reflector is replaced by a diffuse reflector. FIG. 7 includes a pulse height spectrum 702 corresponding to light propagated by wavelength shifting fibers in a 5 cm (2 in.) by 127 cm (50 in.) radiation detection system having PMTs at both ends. Additionally, FIG. 7 illustrates another pulse height spectrum 704 corresponding to light propagated by wavelength shifting fibers in a 5 cm by 127 cm radiation detection system, in which a PMT is coupled to each end but only one PMT is operating. FIG. 7 also illustrates a pulse height spectrum 706 corresponding to light propagated by wavelength shifting fibers in a 5 cm by 127 cm radiation detection system having a PMT coupled to one end and a PTFE reflector coupled to the other end. The highest channel in pulse height spectrum 702 is approximately channel 1000, the highest channel in pulse height spectrum 704 is approximately channel 700, and highest channel in pulse height spectrum 706 is approximately channel 900. Thus, the highest channel, and therefore, the highest peak voltage sensed, for the radiation detection system including the reflector (pulse height spectrum 706), is between the highest channels (peak voltage sensed) for the radiation detection system with two operating PMTs and the radiation detection system with two PMTs (pulse height spectrum 702) and only one PMT operating (pulse height spectrum 704). Note that the highest channel (highest peak voltage sensed) for the radiation detection system including the reflector is closer to the highest channel (peak voltage sensed) for the radiation detection system with two operating PMTs than the radiation detection system with two PMTs and only one PMT operating.

FIG. 8 illustrates the pulse height spectra 702, 704 and 706 after pulse shape analysis. As illustrated, the pulse height spectrum 706 corresponding to use of a PTFE reflector and an operating PMT more closely resembles the pulse height spectrum 702 corresponding to two operating PMTs, than the pulse height spectrum 704 in which only one PMT is operating and no reflector is used. Further, as illustrated in FIG. 8, use of the PTFE reflector provides a better S/N ratio than using two operating PMTs, as illustrated by the valley 708. Thus, when comparing the data in FIGS. 5 to 8, a specular reflector and a diffused reflector can provide substantially similar or even substantially identical results. Therefore, a designer can choose the type of reflector to use without significantly affecting the data obtained from the radiation detection system.

As an alternative to using a reflector in combination with a photosensor, signal-to-noise ratio can also be improved by using a plurality of photosensors and summing the electrical pulses output by the plurality of photosensors before analyzing a pulse shape to determine whether the electrical pulses correspond to target radiation, such as neutrons.

Many different aspects and embodiments are possible. Some of those aspects and embodiments are described below. After reading this specification, skilled artisans will appreciate that those aspects and embodiments are only illustrative and do not limit the scope of the present invention. Additionally, those skilled in the art will understand that some embodiments that include analog circuits can be similarly implemented using digital circuits, and vice versa.

According to a first aspect, a radiation detection system can include a first material to produce a first light in response to receiving a target radiation. The radiation detection system can also include a second material to propagate a second light to a first end of the second material and to a second end of the second material, in response to receiving the first light. The radiation detection system can also include a reflector coupled to the first end of the second material.

In an embodiment of the first aspect, the target radiation can include a neutron. In another embodiment of the first aspect, the target radiation can include gamma radiation.

In another embodiment of the first aspect, the first light can include scintillation light. The first material can include a first compound to produce a secondary particle in response to receiving the neutron, and the first material can include a second compound to produce the scintillation light in response to receiving the secondary particle. The first compound can include $^6$Li or $^{10}$B. The second compound can include ZnS, CaWO$_4$, Y$_2$SiO$_5$, ZnO, or ZnCdS. In another embodiment of the first aspect, the first material can include a powder.

In another embodiment of the first aspect, the second material can be configured to produce the second light in response to the first light. The second material comprises a wavelength shifting fiber. The wavelength shifting fiber can include a core material and a cladding material having different refractive indices. For example, the wavelength shifting fiber can include a polystyrene material clad with an acrylic material.

In another embodiment of the first aspect, a wavelength of the second light can be greater than a wavelength of the first light. In another embodiment of the first aspect, a wavelength of the second light can be in a range from approximately 470 nm to approximately 700 nm.

In another embodiment of the first aspect, the wavelength shifting fiber is included in a layer of wavelength shifting fibers abutting a layer of the first material. The reflector can be coupled to a first end of the layer of wavelength shifting fibers.

In another embodiment of the first aspect, a plurality of layers of the first material can alternate with a plurality of layers of wavelength shifting fibers. For instance, the plurality of layers of the first material can include four layers of the first material, and the plurality of layers of wavelength shifting fibers can include five layers of the wavelength shifting fibers.

In another embodiment of the first aspect, the radiation detection system can include a photosensor coupled to the second end of the second material.

In another embodiment of the first aspect, the reflector can include a specular reflector. For instance, the reflector can include an aluminized polyester.

In another embodiment of the first aspect, the reflector can include a diffuse reflector. For instance, the reflector can include polytetrafluoroethylene.

In another embodiment of the first aspect, the reflector can be optically coupled to wavelength shifting fiber. For instance, a silicone-containing material can optically couple the reflector to the wavelength shifting fiber.

In another embodiment of the first aspect, the radiation detection system can include a thermalyzer to convert a fast neutron to a thermal neutron. For example, the thermalyzer can include a plastic material surrounding the radiation detection system. In another example, the thermalyzer can include a plastic compound within the second material.

In another embodiment of the first aspect, the second material can include a doped polymer sheet. For example, the doped polymer sheet can include polyvinyltoluene, polystyrene, or polymethylmethacrylate.

According to a second aspect, a radiation detection system can include a first material to produce a scintillation light in response to receiving a neutron, a wavelength shifting material to produce another light in response to the scintillation light and to propagate the other light to a first end of the wavelength shifting material and to a second end of the wavelength shifting material, and a photosensor coupled to the second end of the wavelength shifting material. No photosensor may be coupled to the second ends of the wavelength shifting fibers. The radiation detection system can detect a first peak voltage that is higher than a second peak voltage of another radiation detection system operating in a substantially identical environment, except the other radiation detection system has a single photosensor coupled to only one end of the wavelength shifting material and no reflector. The radiation detection system can operate at a higher signal-to-noise ratio than still another radiation detection system operating in a substantially identical environment, except the still other radiation detection system has two photosensors, each coupled opposite ends of the wavelength shifting material.

In an embodiment of the second aspect, the first material is in a form of a layer, and the wavelength shifting material is in a form of wavelength shifting fibers each having the first end and the second end, wherein the photosensor is coupled to the second ends of the wavelength shifting fibers. In another embodiment, the radiation detection system further includes a reflector coupled to the first end of the wavelength shifting material to reflect a portion of the other light toward the photosensor. In a particular embodiment, the reflector includes a substantially planar reflector, a convex reflector, or a corner reflector.

According to a third aspect, method of forming a radiation detection system can include providing a scintillation material abutting a light propagation material, coupling a reflector to a first end of the light propagation material, and coupling a photosensor to a second end of the light propagation material.

In an embodiment of the third aspect, the scintillation material is configured to produce a first light in response to receiving the target radiation, and the light propagation material is configured to propagate a second light to the first end and to the second end of the light propagation material, in response to receiving the first light. In another embodiment, the light propagation material includes a plurality of wavelength shifting fibers. In another embodiment of the third aspect, the method can include optically coupling the reflector to a first end of each of the plurality of wavelength shifting fibers via an optical coupling material configured to substantially match a refractive index of a particular material included in the plurality of wavelength shifting fibers. For example, the particular material can include polystyrene.

In another embodiment of the third aspect, the method can include preparing the first end of each of the plurality of wavelength shifting fibers before optically coupling the reflector to the first end of each of the plurality of wavelength shifting fibers. For instance, preparing the first end can include cutting the first end.

In another embodiment of the third aspect, preparing the first end can include smoothing, polishing, squaring, roughening, treating, etching, chemically treating, or any combination thereof, the first ends of the wavelength shifting fibers.

In another embodiment of the third aspect, the method can include placing the wavelength shifting fibers together in a supported matrix before preparing the first end of each of the wavelength shifting fibers. The supported matrix can include a mechanical support structure or a casting compound. In another embodiment of the third aspect, the first material can be disposed in channels in the second material.

Note that not all of the activities described above in the general description or the examples are required, that a portion of a specific activity may not be required, and that one or more further activities may be performed in addition to those described. Still further, the order in which activities are listed is not necessarily the order in which they are performed.

Benefits, other advantages, and solutions to problems have been described above with regard to specific embodiments. However, the benefits, advantages, solutions to problems, and any feature(s) that may cause any benefit, advantage, or solution to occur or become more pronounced are not to be construed as a critical, required, or essential feature of any or all the claims.

The specification and illustrations of the embodiments described herein are intended to provide a general understanding of the structure of the various embodiments. The specification and illustrations are not intended to serve as an exhaustive and comprehensive description of all of the elements and features of apparatus and systems that use the structures or methods described herein. Separate embodiments may also be provided in combination in a single embodiment, and conversely, various features that are, for brevity, described in the context of a single embodiment, may also be provided separately or in any subcombination. Further, reference to values stated in ranges includes each and every value within that range. Many other embodiments may be apparent to skilled artisans only after reading this specification. Other embodiments may be used and derived from the disclosure, such that a structural substitution, logical substitution, or another change may be made without departing from the scope of the disclosure. Accordingly, the disclosure is to be regarded as illustrative rather than restrictive.

What is claimed is:

1. A radiation detection system comprising:
a plurality of first layers of a first material to produce a first light in response to receiving a target radiation, wherein each of the first layers has a pair of opposing surfaces;
a plurality of second layers of a second material to propagate a second light to first ends of the second layers and to second ends of the second layers, in response to receiving the first light, wherein each one of the opposing surfaces of the first layers abuts at least one of the second layers, and the first ends of the second layers oppose the second ends of the second layers;
a photosensor coupled to the second ends of the second layers; and
a reflector coupled to the first ends of the second layers and configured to reflect the second light toward the photosensor.

2. The radiation detection system of claim 1, wherein the first material comprises a powder.

3. The radiation detection system of claim 1, wherein each of the second layers comprises a wavelength shifting fiber.

4. The radiation detection system of claim 3, wherein a wavelength of the second light is in a range from approximately 470 nm to approximately 700 nm.

5. The radiation detection system of claim 3, wherein the wavelength shifting fiber abuts at least one of the first layers and wherein the reflector is coupled to first ends of at least some of the wavelength shifting fibers within the second layers.

6. The radiation detection system of claim 5, wherein the plurality of the first layers include four layers of the first material, and the plurality of the second layers include five layers of the second material.

7. The radiation detection system of claim 1, wherein:
the photosensor is a single photosensor in the radiation detection system;
the reflector is coupled to each of the first ends of the second layers and configured to reflect the second light toward the photosensor and into the second material; and
each of the second layers is configured to propagate the second light to the photosensor.

8. The radiation detection system of claim 1, further comprising a silicone-containing material to optically couple the reflector to a wavelength shifting fiber.

9. The radiation detection system of claim 1, wherein the second material comprises a doped polymer sheet.

10. The radiation detection system of claim 9, wherein the doped polymer sheet comprises polyvinyltoluene, polystyrene, or polymethylmethacrylate.

11. The radiation detection system of claim 1, wherein the reflector comprises a substantially planar reflector, a convex reflector, or a corner reflector.

12. A radiation detection system comprising:
a first material to produce a scintillation light in response to receiving a neutron;
a wavelength shifting material to produce another light in response to the scintillation light and to propagate the other light to a first end of the wavelength shifting material and to a second end of the wavelength shifting material; and
a photosensor coupled to the second end of the wavelength shifting material,
wherein:
no photosensor is coupled to the first end of the wavelength shifting fibers;
the radiation detection system detects a first peak voltage that is higher than a second peak voltage of another radiation detection system operating in a substantially identical environment, except the other radiation detection system has a single photosensor coupled to only one end of the wavelength shifting material and no reflector; and
the radiation detection system operates at a higher signal-to-noise ratio than still another radiation detection system operating in a substantially identical environment, except the still other radiation detection system has two photosensors, each coupled opposite ends of the wavelength shifting material.

13. The radiation detection system of claim 12, wherein:
the first material is in a form of a layer; and
the wavelength shifting material is in a form of wavelength shifting fibers each having the first end and the second end, wherein the photo sensor is coupled to the second ends of the wavelength shifting fibers.

14. A method of forming a radiation detection system, the method comprising:
providing a scintillation material abutting a light propagation material, wherein the scintillation material includes a powder and is in a form of a plurality of spaced-apart layers;
coupling a reflector to a first end of the light propagation material; and
coupling a photosensor to a second end of the light propagation material;
wherein the reflector is configured to reflect light toward the photosensor.

15. The method of claim 14, wherein the scintillation material is configured to produce a first light in response to receiving the target radiation, and the light propagation material is configured to propagate a second light to the first end and to the second end of the light propagation material, in response to receiving the first light.

16. The method of claim 14, wherein the light propagation material comprises a plurality of wavelength shifting fibers.

17. The method of claim 16, further comprising optically coupling the reflector to a first end of each of the plurality of wavelength shifting fibers via an optical coupling material configured to substantially match a refractive index of a particular material included in the plurality of wavelength shifting fibers.

18. The method of claim 17, further comprising preparing the first end of each of the plurality of wavelength shifting fibers before optically coupling the reflector to the first end of each of the plurality of wavelength shifting fibers.

19. The method of claim 18, wherein preparing the first end includes:
cutting the first ends; and
smoothing, polishing, squaring, roughening, treating, etching, chemically treating, or any combination thereof, the first ends of the wavelength shifting fibers.

* * * * *